(12) United States Patent
Berg et al.

(10) Patent No.: US 6,485,149 B1
(45) Date of Patent: Nov. 26, 2002

(54) TOTAL INTERNAL REFLECTION WAVELENGTH FILTER

(75) Inventors: John S. Berg, Bellingham, MA (US); Phillip H. Malyak, Canton, MA (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 09/769,882

(22) Filed: Jan. 25, 2001

Related U.S. Application Data

(60) Provisional application No. 60/177,846, filed on Jan. 25, 2000.

(51) Int. Cl.[7] .................................................. G02B 5/04
(52) U.S. Cl. ........................ 359/615; 359/558; 359/837; 359/124; 359/138
(58) Field of Search .................................. 359/615, 558, 359/837, 124, 138, 608, 613, 583, 589; 385/47, 24, 37, 50

(56) References Cited

U.S. PATENT DOCUMENTS

| | | | |
|---|---|---|---|
| 5,640,256 A | * | 6/1997 | De Vreet et al. ................ 359/3 |
| 6,008,920 A | * | 12/1999 | Hendrix ....................... 359/127 |
| 6,198,864 B1 | * | 3/2001 | Lemoff et al. ................. 385/47 |

* cited by examiner

*Primary Examiner*—Mohammad Sikder
(74) *Attorney, Agent, or Firm*—Fish & Richardson P.C.

(57) ABSTRACT

The invention features an apparatus and method for separating an optical beam including multiple wavelength components into targeted subsets of wavelengths by causing different subsets of wavelength components either to undergo a total internal reflection (TIR) at or to transmit through internal surfaces of refractive media.

37 Claims, 3 Drawing Sheets

TOTAL INTERNAL REFLECTION WAVELENGTH FILTER

CROSS-REFERENCE TO RELATED APPLICATIONS

This application is based upon a provisional application, U.S. Ser. No. 60/177,846, filed on Jan. 25, 2000, the contents of which are incorporated herein by reference.

BACKGROUND OF THE INVENTION

The present invention relates to optical filters.

Optical filters are commonly used in wavelength division multiplexed (WDM) optical communication systems. Wavelength division multiplexing increases the transmission capacity of optical communication systems (i.e., bandwidth) by allowing a plurality of optical data signals at different wavelengths to propagate simultaneously over a single optical transmission line. In order to access each of the optical data signals, one or more optical filters separate each data signal by wavelength.

Recently, there has been an explosive growth in consumer demand for bandwidth capacity. The reasons for this growth include the proliferation of Internet access and traffic, and the increasing variety of information that is transmitted over communications links, such as voice, video, e-mail, and multimedia. Because of the acute demand for high-speed, high-volume data transmission, it is desirable to increase the number of optical data signal channels transmitted over a single optical fiber without increasing crosstalk or interference between optical data signals at adjoining wavelengths.

SUMMARY OF THE INVENTION

The invention features an apparatus and method for separating an optical beam including multiple wavelength components into targeted subsets of wavelengths by causing different subsets of wavelength components either to undergo a total internal reflection (TIR) at or to transmit through internal surfaces of refractive media.

In general, in one aspect, the invention features an optical filter for spatially separating a selected subset of wavelength components from an input optical beam including multiple wavelength components. The optical filter includes: a dispersing element positioned to receive the optical beam and angularly disperse the multiple wavelength components of the optical beam as a function of wavelength; and a first internal surface positioned to intercept the angularly dispersed wavelength components and cause a first subset of the multiple wavelength components to totally internally reflect from the first internal surface and a second subset of the multiple wavelength components to transmit through the first internal surface.

Embodiments of the optical filter can include any of the following features.

The optical filter can further include a first prism containing the first internal surface.

The first prism can include at least one reflective interface positioned along a path of the angularly dispersed wavelength components between the dispersing element and the first internal surface to reflect the angularly dispersed wavelength components towards the first internal surface.

The optical filter can further include at least one additional optic positioned along a path of the angularly dispersed wavelength components between the dispersing element and the first prism to direct the angularly dispersed wavelength components towards the first internal surface. For example, the at least one additional optic can include a mirror, a lens, a refractive element, or an additional dispersive element.

Alternatively, the dispersive element can be integral with the first prism. For example the dispersive element can be a grating patterned on, or etched into, the first prism.

The dispersive element can be a grating or a chromatic prism.

The dispersive element can be an acouto-optical modulator.

The optical filter can further include a stage supporting the dispersive element and configured to adjust the orientation of the dispersive element with respect to the input optical beam.

The optical filter can further include a stage supporting the first prism and configured to adjust the orientation of the first internal surface with respect to the angularly dispersed wavelength components.

The selected subset of wavelength components can be the second subset of wavelength components (those transmitted through the first internal surface). For example, the first internal surface can be positioned with respect to the angularly dispersed wavelength to cause the selected subset of wavelengths to only include wavelengths below a wavelength upper limit. Alternatively, for example, the first internal surface can be positioned with respect to the angularly dispersed wavelength to cause the selected subset of wavelengths to only include wavelengths above a wavelength lower limit.

The optical filter can further include a second internal surface positioned to intercept one of the first and second subsets and cause a third subset of the multiple wavelength components to totally internally reflect from the second internal surface and a fourth subset of the multiple wavelength components to transmit through the second internal surface.

For example, the second internal surface can be positioned to intercept the second subset (i.e., those wavelength components transmitted through the first internal surface).

The optical filter can include a first prism containing the first internal surface and a second prism containing the second internal surface.

The selected subset of wavelength components can be the fourth subset of wavelength components. For example, the first internal surface can be positioned with respect to the angularly dispersed wavelength to cause the second subset of wavelengths to only include wavelengths below a wavelength upper limit, and the second internal surface can be positioned with respect to the second subset of wavelength components to cause the fourth subset of wavelengths to only include wavelengths above a wavelength lower limit. Alternatively, the first internal surface can be positioned with respect to the angularly dispersed wavelength to cause the second subset of wavelengths to only include wavelengths above a wavelength lower limit, and the second internal surface can be positioned with respect to the second subset of wavelength components to cause the fourth subset of wavelengths to only include wavelengths below a wavelength upper limit.

The first and second prisms can be integrated into an integral device.

Alternatively, the optical filter can further include at least one additional optic positioned along a path of the second subset of wavelength components between the first prism and the second prism to the second subset of wavelength components towards the second internal surface. For example, the at least one additional optic can include a mirror, a lens, a refractive element, or an additional dispersive element.

The second prism can include at least one reflective interface positioned along a path of the second subset of wavelength components angularly between the first internal surface and the second internal surface to reflect the second subset of wavelength components towards the second internal surface.

The optical filter can further include a stage supporting the second prism and configured to adjust the orientation of the second internal surface with respect to the second subset of wavelength components.

The selected subset can be the third subset of wavelength components.

Also, the second internal surface can be positioned to intercept the first subset, and the selected subset can be the third subset of wavelength components. Alternatively, the selected subset can be the fourth subset of wavelength components.

The optical filter can also include a single prism having both of the first and second internal surfaces.

The optical filter can also include an input fiber and a collimating lens for coupling the input optical beam to the dispersive element.

In general, in another aspect, the invention features a method for spatially separating a selected subset of wavelength components from an input optical beam including multiple wavelength components. The method includes: angularly dispersing the input optical beam as a function of wavelength to form angularly dispersed wavelength components; and directing the angularly dispersed wavelength components to contact a first internal surface along a first direction that causes a first subset of the multiple wavelength components to totally internally reflect from the first internal surface and a second subset of the multiple wavelengths to transmit through the first internal surface.

Embodiments of this aspect of the invention can include any of the features above relating to the optical filter and any of the following features.

The selected subset of wavelength components can be the second subset.

The method can further include directing one of the first and second subsets to contact a second internal surface along a second direction that causes a third subset of the multiple wavelength components to totally internally reflect from the second internal surface and a fourth subset of the multiple wavelengths to transmit through the second internal surface. For example, the second subset can be directed to the contact the second internal surface and the selected subset of wavelength components can be the fourth subset.

The input optical beam can include wavelength division multiplex (WDM) signals.

Embodiments of the invention may include many advantages.

For example, closely spaced wavelength components of a multi-wavelength optical signal can be separated from one another. This is possible because the dispersive element causes each wavelength component to propagate at different angles from one another, and subsequent internal surfaces intersecting the angular dispersed components precisely distinguish components incident above the critical angle from those incident below the critical angle. As a result, one internal surface can be oriented to precisely define an upper wavelength limit for the filter, and another internal surface can be oriented to precisely define a lower wavelength limit for the filter. Accordingly, the optical filter can be used in WDM communication systems to increase the number of optical data signals and reduce crosstalk by separating narrow bandwidth subsets of wavelength components of a multi-wavelength optical beam.

Moreover, the upper and lower limits of the wavelength filter can be tuned by adjusting the propagation angles of the angularly dispersed wavelength components and/or adjusting the orientation of one or more of the internal surfaces intercepting the components. Such adjustments permit selection of which angular dispersed wavelength components are totally internally reflected.

Other aspects, advantages, and features of the invention follow.

DETAILED DESCRIPTION

In general, the invention features methods and systems for selecting and separating specific subsets of wavelength components from an optical beam containing a plurality of wavelength components. As described in greater detail below, the system specifies the components of each subset by angularly dispersing the optical beam as a function of wavelength and exploiting the reflective properties of internal surfaces.

Figure 1:
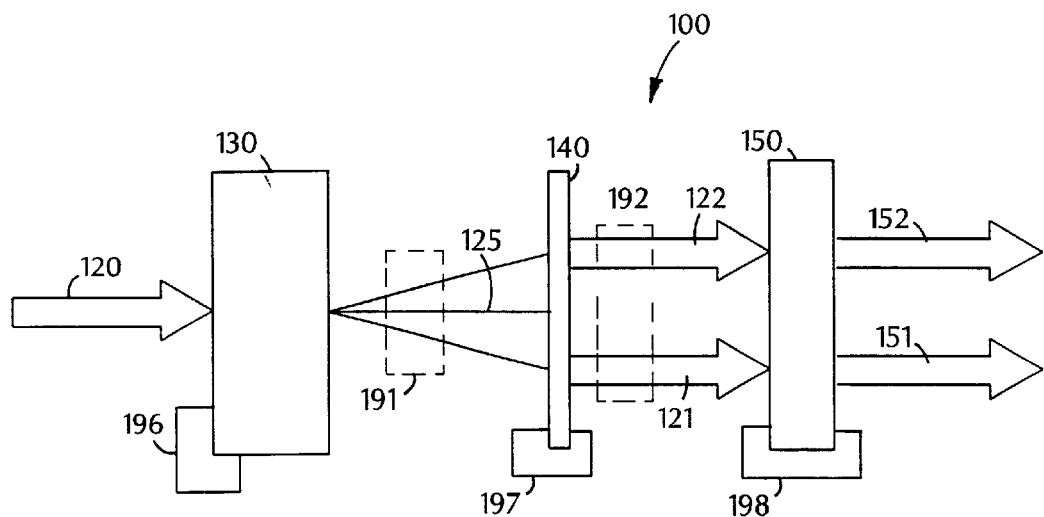
FIG. 1 is a schematic block diagram of an optical filter.

FIG. 1 is a block diagram illustrating conceptually components of an optical filter 100 for selecting a targeted subset of wavelength components from an input optical beam 120. Optical filter 100 includes a dispersing element 130 for angularly dispersing optical beam 120 as a function of wavelength, a first internal surface 140, and a second internal surface 150. During operation, dispersing element 130 angularly disperses optical beam 120 to produce an angularly dispersed beam 125, in which different wavelength components of input beam 120 propagate along different angular paths.

Internal surface 140 is positioned to intersect angularly dispersed beam 125 and oriented to reflect a first subset 121 of the wavelength components and transmit a second subset 122 of the wavelength components. As further described below, whether or not a particular wavelength component reflects from, or transmits through, first internal surface 140 depends on the angle at which it intersects the internal surface (i.e., its incident angle).

Second internal surface 150 is positioned to intersect one of subset 121 and subset 122, and oriented to reflect a third subset 151 of the wavelength components and transmit a fourth subset 152 of the wavelength components. Third subset 151 and fourth subsets 152 are themselves subsets of one of first subset 121 and second subset 122. In other words, second internal surface 150 can be positioned to intersect wavelength components reflected from first internal surface 140 (i.e., wavelength components in the first subset) or it can be positioned to intersect wavelength components transmitted through first internal surface 140 (i.e., wavelength components in the second subset). Furthermore, in some embodiments, it may be possible that both subsets 121 and 122 intersect second internal surface 150. As with the first internal surface, whether or not a particular wavelength component reflects from, or transmits through, second internal surface 150 depends on the angle at which it interests the internal surface (i.e., its incident angle).

An internal surface, as used herein, is the high-index side of any surface that defines an interface between two media having different refractive indices. As is well known in the art, such internal surfaces define a critical angle $\theta_c$ above which incident rays are totally internally reflected. The value of the critical angle $\theta_c$ can be derived from Snell's law, which describes refraction at an interface between two media:

$$N_1 \sin\theta_1 = N_2 \sin\theta_2, \quad (1)$$

where $N_1$ is the refractive index of the first medium, $\theta_1$ is the angle with respect to the interface normal at which a light ray travelling through the first medium contacts the interface (i.e., the incident angle), $N_2$ is the refractive index of the second medium, and $\theta_2$ is the angle with respect to the interface normal at which the light ray travels from the interface and into the second medium (i.e., the refraction angle). When $N_1 > N_2$, the ray is incident on an internal surface, and the critical angle $\theta_c$ is defined as the incident angle corresponding to a refraction angle $\theta_2$ of 90°:

$$\theta_c = \sin^{-1}(N_2/N_1). \quad (2)$$

Any light ray incident on the internal surface at an angle greater than the critical angle $\theta_c$ is totally reflected (i.e., 'total internal reflection').

Figure 2:
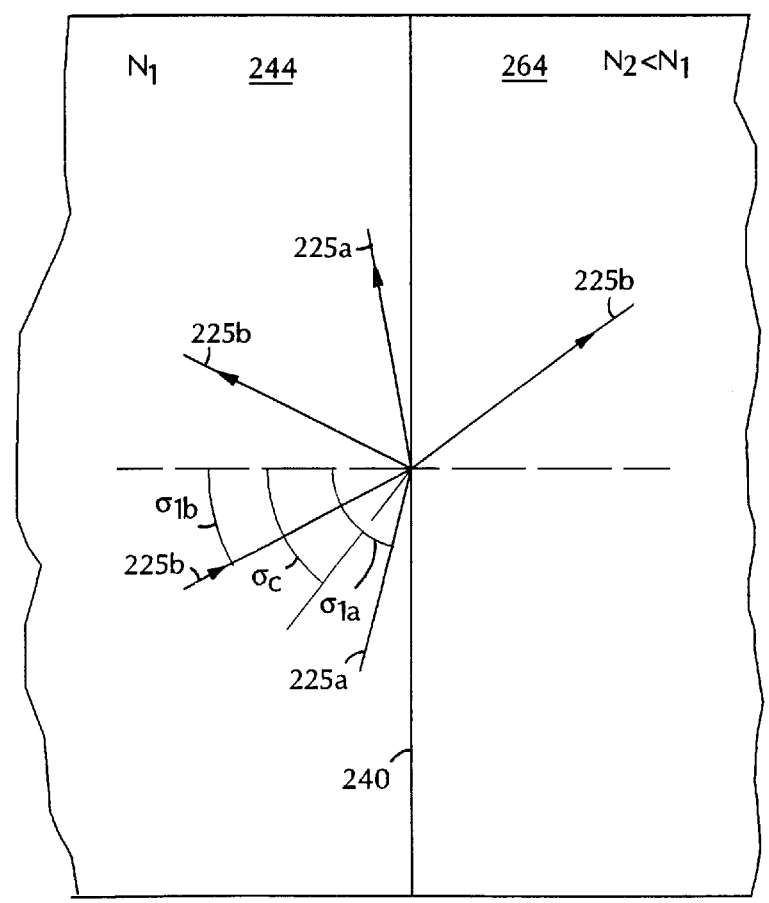
FIG. 2 is a schematic view of an angularly dispersed optical beam intersecting an internal surface.

Referring to FIG. 2, we consider an embodiment where first internal surface 140 is defined by an interface 240 between a high refractive index medium 244 and a low refractive index medium 264. A first wavelength component 225*a* of angularly dispersed beam 125 intersects interface 240 at an incident angle $\theta_{1a}$ greater than critical angle $\theta_c$, and is therefore totally reflected from the interface. A second wavelength component 225*b* of angularly dispersed beam 125, however, intersects interface 240 at an incident angle $\theta_{1b}$ less than critical angle $\theta_c$, and is therefore not totally reflected from the interface. Typically, a substantial portion of wavelength component 225*b* transmits through interface 229 and propagates into low refractive index medium 264 at a refraction angle $\theta_{2b}$ specified by Eq. (1). As incident angle $\theta_{1b}$ approaches critical angle $\theta_c$, however, the fraction of wavelength component 225*b* reflected from interface 240 rapidly increases. The relative fractions can be determined from the well-known Fresnel equations governing reflection and transmission from an interface.

Accordingly, referring again to FIG. 1, all wavelength components of angularly dispersed beam 125 incident on first internal surface 140 at an angle greater than the critical angle will be totally internally reflected and included in subset 121. Conversely, none of these wavelength components are present in transmitted subset 122.

We have a similar result when either of subset 121 or subset 122 intersects second internal surface 150. Second internal surface 150 totally internally reflects wavelength components incident on it at greater than its critical angle (which may be different from the critical angle of first internal surface 140), thereby preventing such wavelength components from being present in transmitted subset 152. Therefore, if we consider subset 152 (containing wavelength components transmitted through second internal surface) for embodiments where only subset 122 (containing wavelength components transmitted through first internal surface 140) is incident on second internal surface 150, internal surfaces 140 and 150 each block wavelength components from being in subset 152.

Thus, in some embodiments, optical filter 100 separates a selected subset of wavelength components by orienting internal surfaces 140 and 150 relative to the angularly dispersed wavelength components such that one surface defines one extreme (e.g., an upper or lower wavelength limit) of the targeted subset and the other surface defines the opposite extreme of the targeted subset. By adjusting the incident angles of the different wavelength components and/or altering the critical angles, the upper and lower wavelength limits can be tuned to specify a selected band pass. Such an embodiment is shown in FIG. 3.

Figure 3:
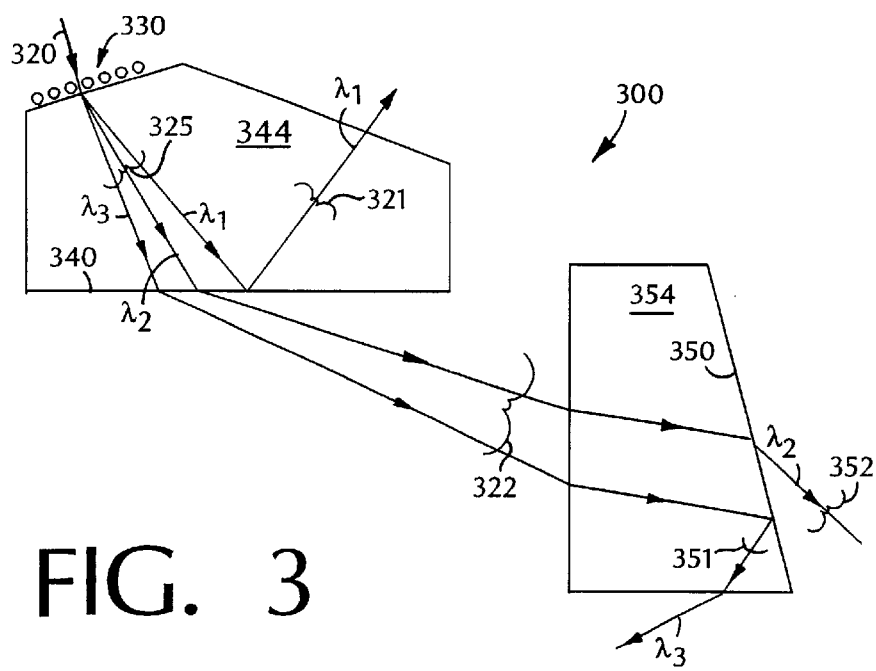
FIG. 3 is a perspective view of an optical filter constructed according to the present invention.

Referring to FIG. 3, an optical filter 300 includes a diffraction grating 330, a first prism 344 having an internal surface 340, and a second prism 354 having an internal surface 350. Prisms 344 and 354 are positioned within a medium 364 (e.g., air) having a refractive index less than that of either prism. As described in greater detail below, internal surface 340 is positioned to reflect a first subset 321 of wavelength components and transmit a second subset 322 of wavelength components, and internal surface 350 is positioned to reflect a third subset 351 of wavelength components and transmit a fourth subset 352 of wavelength components In the presently described embodiment, grating 330 is a patterned film on an exposed face of prism 344. Grating 330 angularly disperses an input optical beam 320 as a function of wavelength to produce an angularly dispersed beam 325. The dispersion follows the well-known grating equation:

$$\theta_d = \sin^{-1}(n\lambda/d - \sin\theta_i), \quad (3)$$

where $\theta_d$ is the wavelength dependent diffraction angle, $\theta_i$ is the incident angle of input beam 320 on the grating, $\lambda$ is wavelength, n is an integer equal to the diffraction order (typically n=1), and d is the grating period. From Eq. 3, we see that larger wavelength components diffract to larger angles. Therefore, if we consider wavelength components $\lambda_1$, $\lambda_2$, and $\lambda_3$ in angularly dispersed beam 325, where $\lambda_1 > \lambda_2 > \lambda_3$, the respective diffraction angles of such components, $\theta_{d1}$, $\theta_{d2}$, and $\theta_{d3}$, satisfy $\theta_{d1} > \theta_{d2} > \theta_{d3}$.

Because of the orientation of internal surface 340 relative to grating 330 in prism 344, those wavelength components diffracted to larger angles are incident on internal surface 340 at larger angles. Thus, the orientation of internal surface 340 is selected such that it totally internally reflects wavelength component $\lambda_1$ (which is incident on internal surface 340 above the critical angle $\theta_c$ for internal surface 340) and transmits wavelength components $\lambda_2$ and $\lambda_3$ (which are incident on internal surface 340 below the critical angle $\theta_c$ for internal surface 340). More generally, total internal reflection by internal surface 340 provides an upper limit for the wavelength components present in transmitted subset 322.

Prism 354 is positioned to receive the wavelength components of transmitted subset 322, which then intersect internal surface 350. Because of the orientation of prism 354, those larger wavelength components that were diffracted by grating 330 to larger diffraction angles now intersect internal surface 350 at smaller angles. Thus, the orientation of internal surface 350 is selected such that it totally internally reflects wavelength component $\lambda_3$ (which is incident on internal surface 350 above the critical angle $\theta_c$ for internal surface 350) and transmits wavelength component $\lambda_2$ (which is incident on internal surface 350 below the critical angle $\theta_c$ for internal surface 350). More generally, total internal reflection by internal surface 350 provides a lower limit for the wavelength components present in transmitted subset 352. In addition, because transmitted subset 352 is derived from transmitted subset 321, total internal reflection by internal surface 340 provides the upper limit for the wavelength components present in transmitted subset 352. Thus, grating 330 and prisms 344 and 354 combine to form a band pass filter for input beam 320, with the desired output corresponding to those components transmitted through both internal surfaces 340 and 350. For example, optical filter 300 passes wavelength component $\lambda_2$, but not wavelength components $\lambda_1$ and $\lambda_3$.

Figure 4:
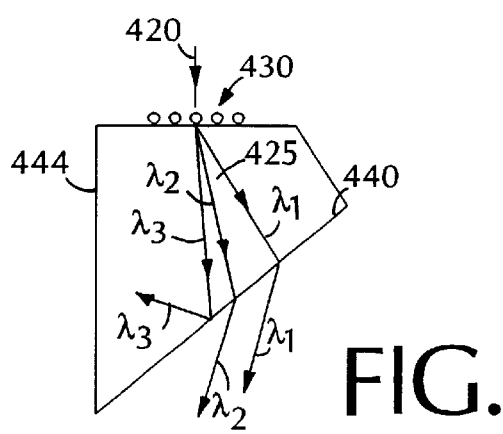
FIG. 4 is a perspective view of a prism for use with another embodiment of an optical filter constructed according to the present invention.

In other embodiments of the optical filter, the angularly dispersed wavelength components can be directed to the first internal surface such that the larger wavelength components are incident at smaller angles, in which case the first internal surface provides the upper wavelength limit for the filter, and the angularly dispersed wavelength components transmitted by the first internal surface can be directed to the second internal surface such that larger wavelength components are incident at larger angles, in which case the second internal surface provides the lower limit for the filter. For example, FIG. 4 shows a prism 444, which, like prism 344, includes a diffraction grating 430 at a first input surface and an internal surface 440. In this embodiment, internal surface 440 is oriented with respect to diffraction grating 430 such that wavelength components $\lambda_1$, $\lambda_2$, and $\lambda_3$ in angularly dispersed beam 425, where $\lambda_1 > \lambda_2 > \lambda_3$, have incident angles $\theta_{i1}$, $\theta_{i2}$, and $\theta_{i3}$ to internal surface 440 that satisfy $\theta_{i1} < \theta_{i2} < \theta_{i3}$. Accordingly, internal surface 440 totally internally reflects wavelength component $\lambda_3$ (which is incident on internal surface 440 above the critical angle $\theta_c$ for internal surface 440) and transmits wavelength components $\lambda_1$, and $\lambda_2$ (which are incident on internal surface 440 below the critical angle $\theta_c$ for internal surface 440). The embodiments of FIGS. 3 and 4 show that one can select the orientations of the internal surfaces to produce a desired mapping of wavelength to incident angle for each of the internal surfaces.

More generally, in other embodiments of the optical filter, there can be many ways to select and manipulate how the angularly dispersed wavelength components are incident on either of the internal surfaces. For example, one or both prisms having the first and second internal surfaces can also include one or more intermediate surfaces that redirect the angularly dispersed wavelength components from an input face of the prism to the internal surface that produces total internal reflection. Furthermore, the incident angle of input beam 320 on grating 330 can be adjusted to alter the dispersion of the components in dispersed beam 325 according to Eq. 3. Also, although the embodiment of FIG. 3 has grating 330 integral with prism 344, in other embodiments the dispersive element can be spaced from a prism containing the first internal surface. Thus, referring now to optical filter 100 in FIG. 1, one or more intermediate optics 192 (e.g., lenses, mirrors, refractive elements, and additional dispersive elements) can be positioned between dispersive element 130 and first internal surface 140 to manipulate the wavelength mapping of the incident angles of wavelength components of angularly dispersed beam 125 on first internal surface 140. Moreover, one or both of dispersive element 130 and a prism defining first internal surface 140 (e.g., prism 344 in the embodiment of FIG. 3) may be mounted on stages 196 and 197, respectively, that permit adjustments to their relative orientations, and thereby adjusts the angle at which each wavelength component of dispersed beam 125 is incident on first internal surface 140.

Similarly, one or more intermediate optics 193 (e.g., lenses, mirrors, refractive elements, and additional dispersive elements) can be positioned between a first prism having first internal surface 140 and a second prism having second internal surface 150 (e.g., between prisms 344 and 354 in the embodiment of FIG. 3) to manipulate the wavelength mapping of the incident angles on second internal surface 150 of wavelength components of the subset directed to second internal surface 150 (e.g., transmitted subset 352 in the embodiment of FIG. 3). Also, the second prism having second internal surface 150 may be mounted on a stage 198 that permits adjustments to its relative orientations, and thereby adjusts the angle at which each wavelength component of the subset directed to second internal surface 150 is incident on second internal surface 150.

Thus, optical filter 100 can specify the filtered wavelength components by selecting: i) the dispersion of input beam 120; ii) the mapping of wavelength to incident angle on the first internal surface; and iii) the mapping of wavelength to incident angle on the second internal surface. Depending on the embodiment, one or more of such selections may fixed, or, one or more of the selections may be adjustable to allow tuning of the filtered wavelengths, e.g., tuning of one or both of the upper and lower wavelength limits.

Figure 5:
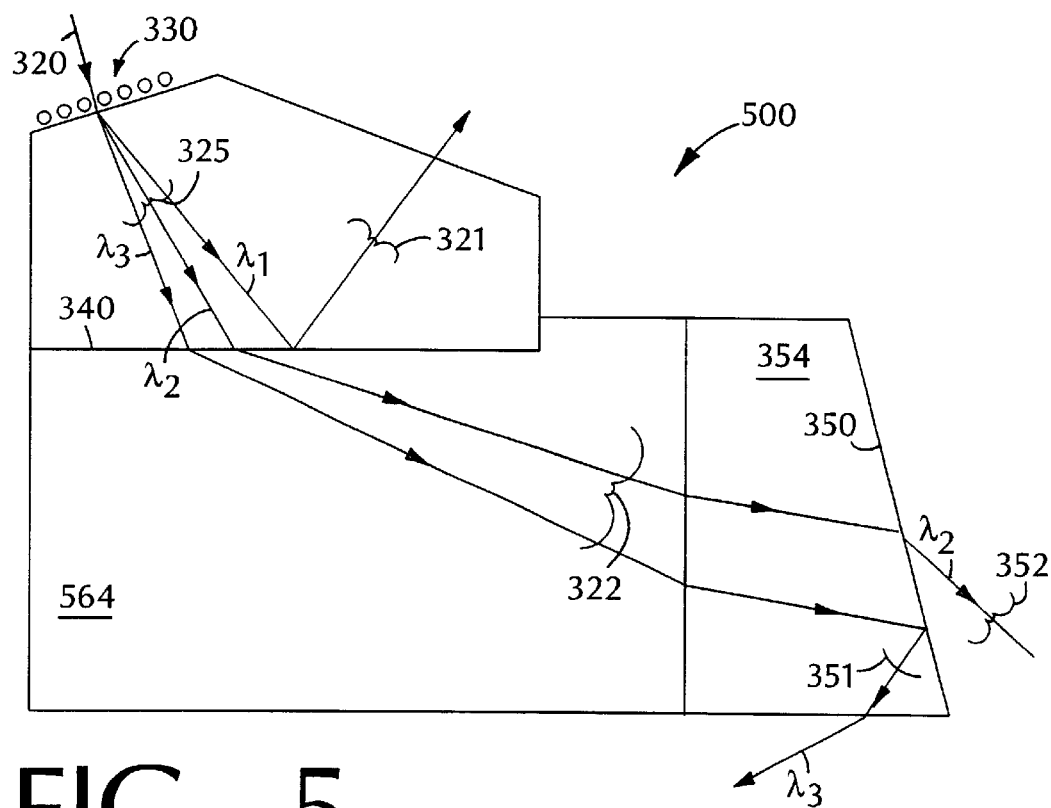
FIG. 5 is a perspective view of another embodiment of an optical filter constructed according to the present invention.

For example, referring to FIG. 5, optical filter 500 is identical to optical filter 300 shown in FIG. 3, except that an additional low index prism 564 is fused to prisms 344 and 354 to construct filter 500 as a single integrated component. Alternatively, referring to FIG. 6, optical filter 600 is identical to optical filter 300 except prisms 344 and 354 are mounted on rotations stages 697 and 698 to allow tuning of the upper and lower wavelength limits. Each rotation stage can be electrically controlled by one or more actuators. More generally, such actuators can be used to adjust the position of any element that directly or indirectly affects the mappings of wavelength to incident angle for the internal surfaces. The actuator may be, for example, a motorized actuator, an electromagnetic motor, an electrostatic motor, or a piezoelectric motor. Furthermore, in other embodiments, the critical angle of the internal surface can be altered by changing the effective index of refraction at the internal surface by applying electric and magnetic filed to exploit the electro- and magneto-optical properties of the prisms.

Figure 6:
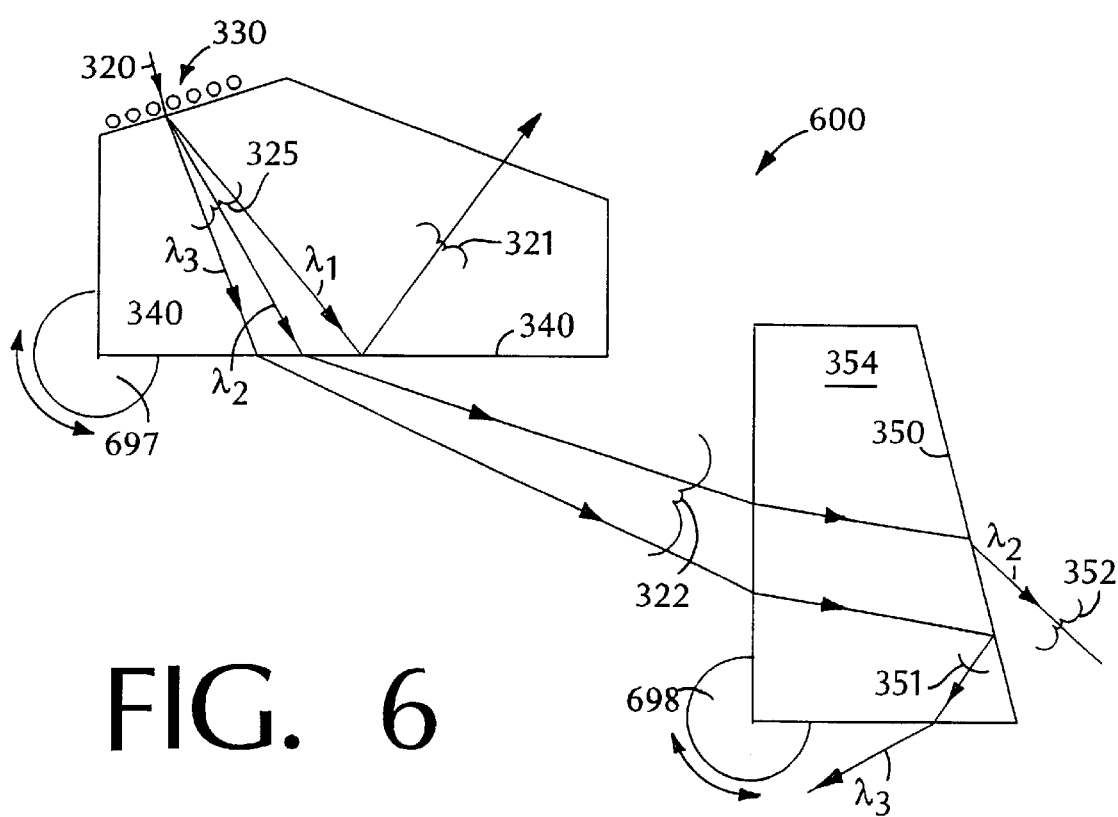
FIG. 6 is a perspective view of another embodiment of an optical filter constructed according to the present invention.

In the embodiments shown in FIGS. 3, 5, and 6, the output of the optical filter corresponds to the subset of wavelength components from the angularly dispersed beam that is transmitted through both the first and second internal surfaces. As described above, such a subset necessarily excludes wavelength components incident on either internal surface at an angle the their respective critical angle because such components are totally reflected from that surface.

In other embodiments of the optical filter, however, it may be acceptable to select as the output other permutations of the transmitted and reflected subsets at each internal surface. This is because the wavelength components incident on either internal surface at below the their respective critical angles are, often, substantially transmitted through the interface unless the incident angle is very close to the critical angle. Thus, for some applications, a small leakage of undesired wavelength components in the reflected subset may be acceptable. For such applications, embodiments of the optical filter include those that: i) direct the wavelength components transmitted through the first internal surface to the second internal surface, and select as an output the resulting wavelength components that are reflected by the second internal surface; ii) direct the wavelength components reflected from the first internal surface to the second internal surface, and select as an output the resulting wavelength components that are transmitted through the second internal surface; and iii) direct the wavelength components reflected through the first internal surface to the second internal surface, and select as an output the resulting wavelength components that are reflected by the second internal surface. These permutations are generally included in the box diagram of optical filter 100 in FIG. 1.

Figure 7:
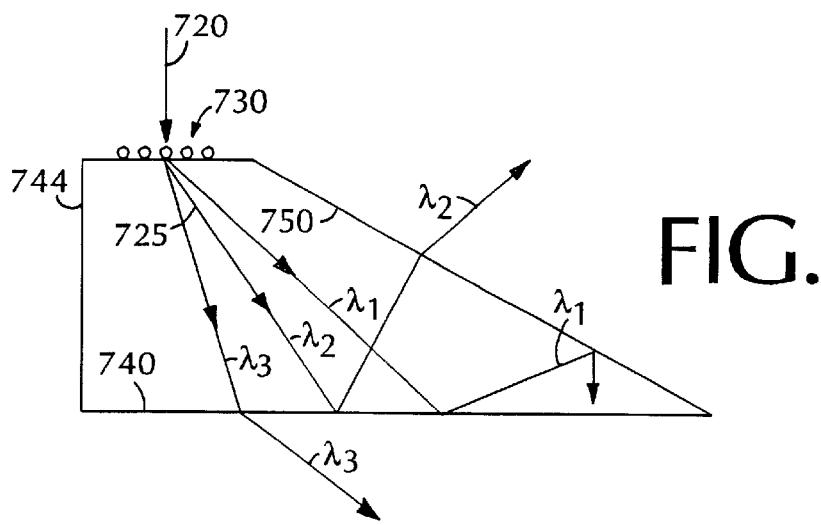
FIG. 7 is a perspective view of another embodiment of an optical filter constructed according to the present invention.

One such embodiment is shown in FIG. 7, where a single prism 744 is used to provide both the first and second internal surface. Referring to FIG. 7, optical filter 700, like optical filter 300, includes a patterned film grating 730 on an exposed face of prism 744. Grating 730 angularly disperses an input optical beam 720 as a function of wavelength to produce an angularly dispersed beam 725. Wavelength components $\lambda_1$, $\lambda_2$, and $\lambda_3$ in angularly dispersed beam 725, where $\lambda_1 > \lambda_2 > \lambda_3$, then contact a first internal surface 740, with larger wavelengths being incident at larger angles. Internal surface 740 is oriented such that the $\lambda_2$ and $\lambda_3$ wavelength components are totally internally reflected, whereas the $\lambda_1$ wavelength component is substantially transmitted through internal surface 740. The $\lambda_2$ and $\lambda_3$ wavelength components are then incident on a second internal surface 750. Second internal surface 750 is oriented to totally internal reflect the $\lambda_3$ wavelength component and transmit the $\lambda_2$ wavelength components (and other such wavelengths in the band pass) as the output.

Furthermore, in any of the above embodiments the patterned grating can be replaced with a grating etched directly into the prism. More generally, dispersing element 130 can be any type of grating (e.g., reflective, transmissive, echelle, holographic, phase-only, amplitude-only, phase and amplitude, etc.), a chromatic prism, an acousto-optic modulator (in which case the grating period can be dynamically controlled), or any element or combination of such elements that cause at least some wavelength components of a multi-wavelength input beam to propagate at angles to one another.

The prisms having the internal surfaces can be made of any optical material, such as fused silica, magnesium fluoride, or calcium fluoride, and of any desired size. The prisms may be fabricated with micro-machining techniques, so that the size of the optical filter can be made very small and thereby facilitate incorporating it into large-scale integrated devices. A micro-sized optical filter can be fabricated, for example, by known etching techniques, e.g., photolithographic processes, to produce at least two internal surfaces in a block of refractive media, such as silica. The micro-sized optical filter may also include a dispersing element, such as a grating, etched into the optical material. The optical material of the optical component may also be selected to preferentially absorb or transmit certain wavelength components of the optical beam. The optical filter may also be formed of macro- and micro-sized optical components.

Although the above embodiments include only two internal surfaces, the optical filter can include any combination of prisms and internal surfaces to separate multiple subsets of wavelength components from the optical beam. For example, a series of refractive media and internal surfaces may be combined in series to demultiplex an optical data signal into a plurality of spatially separated pass bands. Furthermore, any of the optical filters described above can include an input fiber and a collimating lens for coupling the multi-wavelength input beam to the dispersive element.

Furthermore, some embodiment may involve only a single internal surface providing total internal reflection. Such embodiments are suitable for optical filters for which only an upper wavelength limit is necessary, or only a lower wavelength limit is necessary. Also, a single internal surface may be suitable for embodiments in which one or more dispersive elements produce a discontinuous mapping between wavelength and propagation angle.

Other aspects, advantages, and modifications are within the scope of the following claims.

What is claimed is:

1. An optical filter for spatially separating a selected subset of wavelength components from an input optical beam including multiple wavelength components, the optical filter comprising:

a dispersing element positioned to receive the optical beam and angularly disperse the multiple wavelength components of the optical beam as a function of wavelength; and a first internal surface positioned to intercept the angularly dispersed wavelength components and cause a first subset of the multiple wavelength components to totally internally reflect from the first internal surface and a second subset of the multiple wavelength components to transmit through the first internal surface.

2. The optical filter of claim 1, further comprising a first prism containing the first internal surface.

3. The optical filter of claim 2, wherein the first prism includes at least one reflective interface positioned along a path of the angularly dispersed wavelength components between the dispersing element and the first internal surface to reflect the angularly dispersed wavelength components towards the first internal surface.

4. The optical filter of claim 2, further comprising at least one additional optic positioned along a path of the angularly dispersed wavelength components between the dispersing element and the first prism to direct the angularly dispersed wavelength components towards the first internal surface.

5. The optical filter of claim 4, wherein the at least one additional optic comprises a mirror, a lens, a refractive element, or an additional dispersive element.

6. The optical filter of claim 2, wherein the dispersive element is integral with the first prism.

7. The optical filter of claim 6, wherein the dispersive element is a grating.

8. The optical filter of claim 1, wherein the dispersive element is a grating.

9. The optical filter of claim 1, wherein the dispersive element is an acouto-optical modulator.

10. The optical filter of claim 1, further comprising a stage supporting the dispersive element and configured to adjust the orientation of the dispersive element with respect to the input optical beam.

11. The optical filter of claim 2, further comprising a stage supporting the first prism and configured to adjust the orientation of the first internal surface with respect to the angularly dispersed wavelength components.

12. The optical filter of claim 1, wherein the selected subset of wavelength components is the second subset of wavelength components.

13. The optical filter of claim 12, wherein the first internal surface is positioned with respect to the angularly dispersed wavelength to cause the selected subset of wavelengths to only include wavelengths below a wavelength upper limit.

14. The optical filter of claim 12, wherein the first internal surface is positioned with respect to the angularly dispersed wavelength to cause the selected subset of wavelengths to only include wavelengths above a wavelength lower limit.

15. The optical filter of claim 1, further comprising a second internal surface positioned to intercept one of the first and second subsets and cause a third subset of the multiple wavelength components to totally internally reflect from the second internal surface and a fourth subset of the multiple wavelength components to transmit through the second internal surface.

16. The optical filter of claim 15, wherein the second internal surface is positioned to intercept the second subset.

17. The optical filter of claim 16, further comprising a first prism containing the first internal surface and a second prism containing the second internal surface.

18. The optical filter of claim 17, wherein the selected subset of wavelength components is the fourth subset of wavelength components.

19. The optical filter of claim 18, wherein the first internal surface is positioned with respect to the angularly dispersed wavelength to cause the second subset of wavelengths to only include wavelengths below a wavelength upper limit, and the second internal surface is positioned with respect to the second subset of wavelength components to cause the fourth subset of wavelengths to only include wavelengths above a wavelength lower limit.

20. The optical filter of claim 18, wherein the first internal surface is positioned with respect to the angularly dispersed wavelength to cause the second subset of wavelengths to only include wavelengths above a wavelength lower limit, and the second internal surface is positioned with respect to the second subset of wavelength components to cause the fourth subset of wavelengths to only include wavelengths below a wavelength upper limit.

21. The optical filter of claim 17, wherein the first and second prisms are integrated into an integral device.

22. The optical filter of claim 17, further comprising at least one additional optic positioned along a path of the second subset of wavelength components between the first prism and the second prism to the second subset of wavelength components towards the second internal surface.

23. The optical filter of claim 22, wherein the at least one additional optic comprises a mirror, a lens, a refractive element, or an additional dispersive element.

24. The optical filter of claim 17, wherein the second prism includes at least one reflective interface positioned along a path of the second subset of wavelength components angularly between the first internal surface and the second internal surface to reflect the second subset of wavelength components towards the second internal surface.

25. The optical filter of claim 17, further comprising a stage supporting the second prism and configured to adjust the orientation of the second internal surface with respect to the second subset of wavelength components.

26. The optical filter of claim 16, wherein the selected subset is the third subset of wavelength components.

27. The optical filter of claim 15, wherein the second internal surface is positioned to intercept the first subset.

28. The optical filter of claim 27, wherein the selected subset is the third subset of wavelength components.

29. The optical filter of claim 27, wherein the selected subset is the fourth subset of wavelength components.

30. The optical filter of claim 15, further comprising a prism having both of the first and second internal surfaces.

31. The optical filter of claim 1, further comprising an input fiber and a collimating lens for coupling the input optical beam to the dispersive element.

32. A method for spatially separating a selected subset of wavelength components from an input optical beam including multiple wavelength components, the method comprising:
    angularly dispersing the input optical beam as a function of wavelength to form angularly dispersed wavelength components; and
    directing the angularly dispersed wavelength components to contact a first internal surface along a first direction that causes a first subset of the multiple wavelength components to totally internally reflect from the first internal surface and a second subset of the multiple wavelengths to transmit through the first internal surface.

33. The method of claim 32, wherein the selected subset of wavelength components is the second subset.

34. The method of claim 32 further comprising:
    directing one of the first and second subsets to contact a second internal surface along a second direction that causes a third subset of the multiple wavelength components to totally internally reflect from the second internal surface and a fourth subset of the multiple wavelengths to transmit through the second internal surface.

35. The method of claim 34, wherein the second subset is directed to the contact the second internal surface and the selected subset of wavelength components is the fourth subset.

36. The method of claim 32, wherein the input optical beam comprises wavelength division multiplex (WDM) signals.

37. The optical filter of claim 1, wherein the dispersive element is a chromatic prism.

* * * * *